July 13, 1943.                J. L. PINSON                2,324,020
                            POULTRY FOUNTAIN
                           Filed Sept. 9, 1941
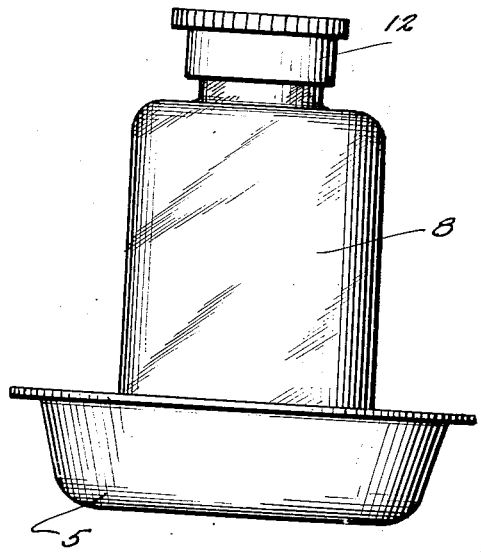
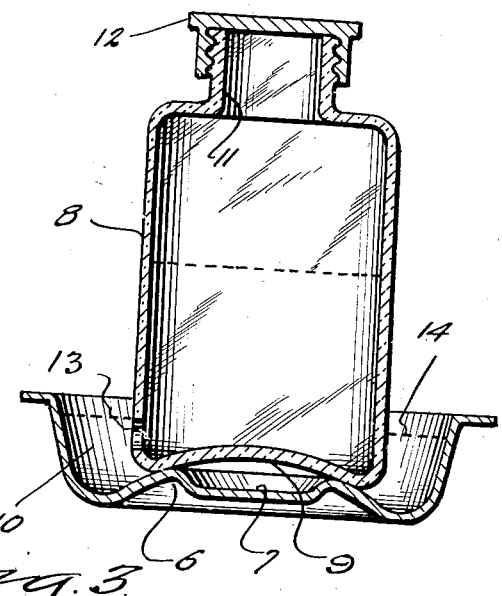
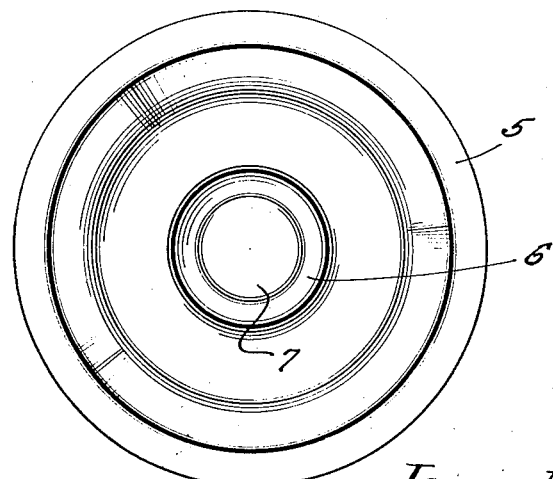
Inventor
James L. Pinson
By Clarence A. O'Brien
Attorney Patented July 13, 1943

2,324,020

UNITED STATES PATENT OFFICE 2,324,020

POULTRY FOUNTAIN

James L. Pinson, Cairo, Ga.

Application September 9, 1941, Serial No. 410,216

1 Claim. (Cl. 119—77)

The present invention relates to new and useful improvements in poultry fountains and has for its primary object to provide a portable device of this character embodying automatic feed means to maintain a predetermined level of water therein.

A further object is to provide a device of this character of simple and practical construction, which is neat and attractive in appearance, relatively inexpensive to manufacture and otherwise well adapted for the purposes for which the same is intended.

Other objects and advantages reside in the details of construction as more fully hereinafter described and claimed, reference being had to the accompanying drawing forming part hereof, wherein like numerals refer to like parts throughout and in which—

Figure 1 is a side elevational view.

Figure 2 is a vertical sectional view, and

Figure 3 is a top plan view of the pan.

Referring now to the drawing in detail, wherein for the purpose of illustration I have disclosed a preferred embodiment of the invention, the numeral 5 designates the pan, preferably constructed of metal or other durable material, and having an annular rib 6 rising from the central portion of its bottom to form a shallow well 7.

A glass vessel or container 8 is provided with a concave bottom 9 of a diameter greater than the rib 6 whereby the rib will be positioned within the concaved portion of the bottom of the vessel when the latter is placed in position in the pan and thus serve to center the vessel from the side walls of the pan to form a channel 10 between the side walls of the pan and the vessel. The engagement of the rib 6 with the concaved bottom of the vessel 8 serves to maintain the vessel in a central position in the pan and also prevents accidental sliding of the vessel in the pan should the poultry strike the same.

The top of the bottle or vessel 8 is formed with a threaded neck 11 on which a cap 12 is secured to enable the filling of the bottle with a supply of water.

In one side of the bottle, adjacent its bottom portion, is formed a discharge port 13 which is positioned below the upper edge of the pan so that water from the bottle may enter the pan to a level above the port 13 as shown by the dotted lines 14 in Figure 2 of the drawing. When the water in the pan has reached the level indicated, the water will close the port against the entrance of air into the bottle and the vacuum in the upper portion of the bottle will then prevent further discharge of the water therefrom. As the water in the channel 10 of the pan is consumed to drop the level below the port 13 air will then be permitted to enter the bottle and thus enable a further supply to be discharged into the pan.

It is believed the details of construction, manner of use, and advantages of the device will be readily understood from the foregoing without further detailed explanation.

Having thus described the invention what I claim is:

A poultry fountain comprising a pan, an annular rib rising from the bottom of the pan having sloping walls and forming a shallow well at the center of the pan and an annular round bottomed trough adjacent the sides of the pan, and a closed vessel having a concaved bottom with a portion thereof resting on the sloping walls of the rib to entirely support the vessel on said rib said rib concentrically engaging the concaved portion of the bottom of the vessel to maintain the vessel in spaced relation from the walls of the pan, said vessel being adapted to contain water and having a discharge port adjacent its bottom below the upper edge of the pan for supplying the pan with water to a level above the port.

JAMES L. PINSON.